United States Patent [19]

Cooke et al.

[11] 4,125,702

[45] Nov. 14, 1978

[54] ADDITIVE FOR LOW PROFILE POLYMERIZABLE UNSATURATED POLYESTER MOLDING COMPOSITION

[75] Inventors: Victor F. G. Cooke, Youngstown; Donald H. Thorpe, Williamsville, both of N.Y.

[73] Assignee: Hooker Chemicals & Plastics Corp., Niagara Falls, N.Y.

[21] Appl. No.: 793,222

[22] Filed: May 2, 1977

Related U.S. Application Data

[62] Division of Ser. No. 646,112, Jan. 2, 1976, Pat. No. 4,043,988.

[51] Int. Cl.$^2$ .............. C08F 14/06; C08F 16/08; C08L 67/06
[52] U.S. Cl. ........................... 526/323; 260/873
[58] Field of Search ............... 260/862; 526/323, 328, 526/323.2

[56] References Cited

U.S. PATENT DOCUMENTS

| 3,196,133 | 7/1965 | Piloni et al. ............... 526/325 X |
| 3,230,203 | 9/1966 | Kühne et al. ............... 526/325 X |

*Primary Examiner*—Thomas De Benedictis, Sr.
*Attorney, Agent, or Firm*—Peter F. Casella; James F. Mudd; William G. Gosz

[57] ABSTRACT

Dimensionally stable, pigmentable polyester molding compositions comprise:
  A) polymerizable polyester component; and
  B) an additive component comprising discrete particles of less than about 50 microns diameter of a lightly cross-linked vinyl chloride polymer having a glass transition temperature of below about 100° C and which is chemically inert with respect to the polyester component and is swellable but insoluble therein.

The additive component is a vinyl chloride polymer or copolymer lightly cross-linked with a suitable polyfunctional monomer, such as a diacrylate.

11 Claims, No Drawings

ADDITIVE FOR LOW PROFILE POLYMERIZABLE UNSATURATED POLYESTER MOLDING COMPOSITION

This is a division of application Ser. No. 646,112, filed Jan. 2, 1976 now U.S. Pat. No. 4,043,988.

BACKGROUND OF THE INVENTION

This invention relates to polyester molding compounds and additives therefor characterized by uniform pigmentability and dimensional stability.

For many years polyester resins based on an unsaturated polyester and an unsaturated monomer, such as styrene, have been used in the preparation of molding compositions. When formulated in a known manner with appropriate adjuvants such as fillers, pigments, curing agents, reinforcing agents, and the like, such polyester-based molding compositions may be used in conventional molding processes such as sheet molding or bulk molding to prepare a wide variety of materials or articles which are generally characterized by high strength, light weight and excellent chemical resistance. However, articles fabricated from such molding compositions by conventional molding techniques commonly exhibit poor dimensional stability, due in a large part to shrinkage during the molding process. The poor dimensional stability is typically evidenced by a rough or warped surface (high profile) and surface irregularities such as deep sink marks opposite structural ribs. Thus, considerable difficulties are encountered in the production of molded articles where close size and shape tolerance limits are required since in many instances an inordinate amount of labor is required after removal of a part from the mold to shape it to the exact finish, size or shape required for a given application.

Considerable effort has been expended in recent years, in the development of dimensionally stable (low-profile) polyester molding compositions. It is now well known to those skilled in the art that with the addition of thermoplastic polymers to polyester systems, such as polyester-styrene based resins, there may be prepared compositions which, when formulated with the appropriate adjuvants to form molding compounds, display minimal shrinkage or expansion during the molding process and may be formed with smooth surfaces (low-profile). The thermoplastic polymers which have been used for this purpose include, for example, such materials as polyvinyl acetate, cellulose acetate, cellulose butyrate, polymethyl methacrylate, polystyrene, polyethylene, polyvinyl chloride and saturated polyesters.

With the advent of low-profile unsaturated polyester systems, molding techniques have been increasingly employed in the fabrication of automotive parts such as hood scoops, fender extensions and a wide variety of other parts which require both a smooth surface and close adherence to the size and shape of a precision machined mold.

In the production of articles such as automotive parts, it is particularly desirable to impart the desired color to the articles by addition of a pigment to the molding compound prior to the molding process. This technique eliminates the need for an additional coating step after molding, and in general, minimizes maintenance and extends the useful life of the article since the color is dispersed throughout the material rather than only on the surface. However, it has been found that, in low profile unsaturated polyester molding compounds containing thermoplastic additives, the achievement of uniform coloration is difficult at best. The addition of a thermoplastic polymer, with the exception of polyethylene and polystyrene, to an unsaturated polyester molding compound, results in a non-uniform distribution of the pigment and a "phase out" or separation of non-pigmented and pigmented areas during molding or curing. The result is an undesirable mottled appearance of the surface. When polyethylene or polystyrene is employed as the thermoplastic polymer additive, considerable improvement in the uniformity of pigmentation is achieved. However, the dimensional stability, although improved by the addition of polyethylene or polystyrene is notably less than that achieved with other thermoplastic polymer additives, which phase out during molding or curing. Thus a manufacturer utilizing molding compounds which incorporate thermoplastic polymer additives must choose between a thermoplastic polymer which imparts good surface smoothness and dimensional stability, but which cannot be pigmented uniformly, and a thermoplastic polymer which imparts good pigmentability but is substantially poorer in surface smoothness and dimensional stability.

Accordingly, it is an object of the present invention to provide unsaturated polyester based molding compositions which exhibit a high degree of dimensional stability. It is a further object to provide low-profile additive compositions which may be added to unsaturated polyester based molding compositions to impart a high degree of dimensional stability thereto without adverse effect on the pigmentability of the composition. It is a still further object to provide a method for the production of molded articles from unsaturated polyester based molding compounds, wherein the molded articles are uniformly pigmented and are within close tolerance limits of the size and shape imparted by the mold. It is an additional object to provide articles of manufacture molded from novel polymeric compositions and having uniform pigmentation and closely reproducible size and shape.

SUMMARY OF THE INVENTION

It has now been found that polyester molding compositions having excellent pigmentability and dimensional stability comprise (A) a polymerizable polyester component; and (B) an additive component comprising discrete particles of less than about 50 microns diameter of a cross-linked vinyl chloride polymer having a glass transition temperature (Tg) of below about 100° Celsius and which is chemically inert with respect to the polyester component and is swellable but insoluble therein, the additive component comprising the polymeric reaction product of vinyl chloride and at least one polyfunctional monomer.

The low profile polyester molding compositions of this invention are characterized by dimensional stability, that is smooth surfaces and little or no shrinkage during molding and curing, as well as uniformity of pigmentation or evenness of color in the final molded article.

The present invention may be considered in terms of three major aspects thereof:

(a) novel low profile additives which may be incorporated into unsaturated polyester molding compositions to impart dimensional stability thereto without adverse effect on pigmentability;

(b) unsaturated polyester molding compositions containing novel low profile additives; and (c) molded articles of manufacture prepared therefrom.

Although the unsaturated polyester molding compositions are described in terms of major components thereof, that is the unsaturated polyester component and the additive component, it will be appreciated that, in accordance with known practice, the molding composition may also include additional appropriate ingredients including, for example, fillers, lubricants, pigments, fire retardants, curing agents, reinforcing agents, mold release agents, and the like. The molding compositions of this invention may be uniformly pigmented with organic or inorganic pigments. Pigments for the coloration of the polymer molding compounds may be employed as a powder or as a paste or dispersion in a vehicle that is compatible with the type of polymer to be pigmented. Thus, for example, pigments formulated as a color paste or dispersion in a polyester resin vehicle compatible with polyester resin compositions such as those of the present invention may be employed. However, if desired, a pigment per se or a pigment dispersed in various other vehicles compatible with polyester resins may be employed. In one embodiment, the pigment alone, or as a paste or dispersion, may be admixed with the additive component of this invention prior to incorporation in the polyester molding composition.

DESCRIPTION OF EMBODIMENTS

The Polyester Component

The polymerizable polyester component of the molding compositions of this invention comprises an unsaturated polyester and preferably, in addition, a copolymerizable unsaturated monomer.

The unsaturated polyesters which may be employed include those commonly known in the art, and are generally the reaction product of a polycarboxylic compound and a polyhydric alcohol. The preferred polycarboxylic compounds and polyhydric alcohols are dicarboxylic compounds and dihydric alcohols. Carboxylic compounds and alcohols having a functionality greater than two may be employed, usually in minor amounts. In such cases it may advantageous to incorporate a compensatory amount of monofunctional acid and/or alcohol to control molecular weight and gelation as desired. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydrides can include for example, maleic, fumaric, chloromaleic, ethyl-maleic, itaconic, citraconic, mesaconic, aconitic and acetylene dicarboxylic, and the like either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like and mixtures thereof.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic, and the like and mixtures thereof.

Suitable saturated polyhydric alcohols for use in the preparation of the polyester resins include ethylene glycol, diethylene glycol, propylene glycol, dipropylene glycol, butane diol, pentane diol, hexane diol, dibromoneopentyl glycol, 1,4-cyclohexane dimethanol, glycerol, mannitol, sorbitol, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compounds are 2,2-dichloroethanol; 1,1-dibromo-2-propanol; 2,2,2-tribromoethanol; 1,1,3,3-tetrabromo-2-propanol; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and a saturated alcohol.

The temperature for the reaction between polyhydric alcohols and polybasic acids ranges from about one hundred to two hundred degrees Celsius, although higher or lower temperatures can be used. Esterification catalysts such as para-toluene sulfonic acid, benzene sulfonic acid, betanaphthalene sulfonic acid and the like, or amines such as pyridine, triethyl amine, quinoline and the like can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

The aforementioned unsaturated polyesters and components thereof are intended to be illustrative of polyesters suitable for the compositions of this invention and are not intended to be all-inclusive. The molecular weight of the polymerizable unsaturated polyester is not critical and may vary over a wide range. Typically, the average molecular weight will be in a range from about 500 or less to about 10,000, or higher and preferably from about 700 to about 6000.

A variety of ethylenically unsaturated copolymerizable monomers can be used for curing or cross-linking the ethylenically unsaturated polyesters. The monomer is preferably liquid at reaction temperatures, has the ability to dissolve the unsaturated polyester and is copolymerizable therewith to form a cross-linked structure. Suitable monomers are generally characterized by the presence of at least one reactive $H_2C\!\!=\!\!C$ group per molecule. Specific examples of such monomers include styrene, chlorostyrenes, methyl styrenes such as alpha methyl styrene, p-methyl styrene, vinyl benzyl chloride, divinylbenzene, indene, fluorostyrene, unsaturated esters such as methyl acrylate, methyl methacrylate, as well as other lower aliphatic esters of acrylic and methacrylic acids, allyl acetate, diallyl phthalate, diallyl succinate, diallyl adipate, diallyl sebacate, diethylene glycol bis (allyl carbonate), triallyl phosphate and other allyl esters, and vinyl toluene, diallyl chlorendate, diallyl tetrachlorophthalate, ethylene glycol diacrylate, ethylene glycol dimethacrylate, ethylene glycol diethacrylate and the like and mixtures thereof.

The proportion of unsaturated monomer to unsaturated polyester can vary within the ultimate limits of each as necessary to produce an infusible, insoluble polyester resin. Generally the weight proportion of unsaturated monomer:unsaturated polyester will be between about 0.1 and 9.0 and preferably between about 0.25 and 7.5, part of monomer per part of polyester.

Polymerization catalysts are preferably added to the mixture of unsaturated polyester and unsaturated monomer to effect setting or curing. Catalysts such as benzoyl peroxide, acetyl peroxide, lauryol peroxide, methylethyl ketone peroxide, cumene hydroperoxide, and the like, are satisfactory. Such catalysts are commonly used in proportions of about 0.01 to 10 weight percent of the resin, depending on the efficiency of their action and whether or not substances which inhibit polymerization are present in the mixture.

For convenience in handling and mixing, a portion of the monomer may be combined with the unsaturated polyester, to serve as a solvent therefor prior to the addition of the low profile additive or other compounding ingredients and the remainder of the monomer may then be added during the formulation of the molding compound. To prevent premature polymerization during the initial mixing of the unsaturated polyester and a portion of the monomer, a polymerization inhibitor is advantageously added to the mixture or to one of its components prior to mixing, especially if the polyester-monomer solution is to be stored or shipped in commerce prior to final compounding or molding and curing. Polymerization inhibitors are generally added in amounts of about 0.001 to 1 weight percent of the mixture. Among the inhibitors which may be advantageously employed to prevent premature polymerization of the mixtures of unsaturated polyester and monomer are substances such as hydroquinone, toluhydroquinone, benzoquinone, para-tertiarybutyl catechol, paraphenylene diamine, trinitrobenzene, picric acid and the like.

The Additive Component

The additive component of the present invention comprises discrete particles of a lightly cross-linked vinyl chloride polymer having a glass transition temperature below about 100° Celsius and which is chemically inert with respect to the polymerizable polyester component and is swellable but insoluble therein. The particles are preferably of a size range averaging less than about 50 microns and most preferably less than about 25 microns in diameter to as small as 0.1 microns or less with the only lower limit being that imposed by the difficulty of preparing discrete particles of smaller diameter. Based on ease and economy of preparation as well as achievement of low profile characteristics and pigmentability in the final product, a preferred Particle size is about 3 microns to about 25 microns. Particles having a diameter of less than about 50 microns may be prepared in a known manner, for example, by emulsion or suspension polymerization techniques. Larger size particles may be reduced in size by mechanical methods such as pulverization.

The lightly cross-linked vinyl chloride polymer comprises the polymer reaction product of vinyl chloride and at least one polyfunctional monomer, the functional groups of which are carbon to carbon double bonds capable of radical polymerization. Suitable polyfunctional monomers which may be employed for this purpose include, for example, 1,3-butylene glycol diacrylate; 1,3-butylene glycol dimethacrylate; 1,4-butylene glycol diacrylate; 1,4-butylene glycol dimethacrylate; 1,10-decamethylene glycol diacrylate; 1,10-decamethylene glycol dimethacrylate; ethylene glycol diacrylate; ethylene glycol dimethacrylate; diethylene glycol diacrylate; diethylene glycol dimethacrylate; 1,2 propylene glycol diacrylate; 1,2-propylene glycol dimethacrylate; 1,3-propylene glycol diacrylate; 1,3-propylene glycol dimethacrylate; pentaerythritol tetra acrylate; pentaerythritol tetramethacrylate; 1,6-hexanediol diacrylate; 1,6-hexanediol dimethacrylate; divinyl benzene; diallyl phthalate; diallyl maleate; diallyl fumarate; allyl acrylate; allyl crotonate; divinyl acetal; divinyl formal; divinyl butyral; and the like, or mixtures thereof. The polyfunctional monomer is preferably employed in minor amounts of about 0.1 to about 10 and most preferably about 0.3 to about 5 percent by weight based on the weight of the final cross-linked polymer.

It is important that the lightly cross-linked vinyl chloride polymer that serves as the low profile additive component in accordance with this invention have a glass transition temperature of below about 100° Celsius and preferably of about −10° to about 75° Celsius. Particles having a glass transition temperature of less than about −10° C may exhibit a stickiness or tendency to agglomerate to an undesirable degree resulting in some unevenness of color in the final molded article. Particles characterized by a glass transition temperature above about 100° Celsius often exhibit insufficient thermal expansion to control dimensional stability.

The homopolymer of vinyl chloride is characterized by a glass transition temperature of about 80° Celsius. However, when vinyl chloride is copolymerized with a polyfunctional monomer (cross-linking monomer) the resultant polymer will be characterized by a glass transition temperature higher than that of the homopolymer, depending on the amount of polyfunctional monomer employed. Thus, to obtain a cross-linked polymer of vinyl chloride having a glass transition temperature below about 100° C, wherein vinyl chloride is the sole monofunctional monomer, it is preferred to employ a limited amount, such as about 0.1 to about 2.0 percent by weight of polyfunctional monomer, based on the weight of the final cross-linked product.

Alternatively, in a preferred embodiment, and additional monofunctional comonomer, or mixture of comonomers may be employed to obtain a cross-linked polymer having a lower glass transition temperature. Suitable comonomers which may be employed for this purpose are monofunctional monomers, the functional group of which is a carbon to carbon double bond capable of radical polymerization, and which are capable of forming a linear homopolymer having a glass transition temperature below that of the vinyl chloride homopolymer (Tg about 80° C). The incorporation of such a comonomer will serve to lower the glass transition temperature of the resultant polymer. The preferred comonomers for this purpose are those capable of forming linear homopolymers or copolymers having a glass transition temperature of below about 0° Celsius. Suitable comonomers include for example, ethyl acrylate, butyl acrylate, 2-ethylhexyl acrylate, n-octyl methacrylate, isodecyl methacrylate, lauryl methacrylate, tridecyl methacrylate, 2-methoxyethyl acrylate, 2-ethoxyethyl acrylate, 2-butoxyethyl acrylate, 2-methoxyethyl methacrylate, ethoxyethyl methacrylate, and the like, or mixtures thereof. The most preferred monofunctional comonomers which may be employed in combination with vinyl chloride are ethyl acrylate, n-butyl acrylate and 2-ethylhexyl acrylate. Although the amount of comonomer which may be employed is not critical except with respect to the obtainment of a polymer leaving a desired glass transition temperature, it is preferred to employ a comonomer in amounts of less than about 40 weight percent based on the total cross-linked polymer additive component.

The lightly cross-linked vinyl chloride polymer is advantageously prepared from monomers such as those described hereinabove with the aid of a suitable catalyst such as a peroxide type catalyst. Typical catalysts include, for example, benzoyl peroxide, lauroyl peroxide, caprylyl peroxide, acetyl peroxide, t-butyl perbenzoate, t-butyl peroctoate, and the like.

The uniformity of pigmentation in the final molded article will vary somewhat depending on the shape of the low profile additive particles. For maximum uniformity of pigmentation it is preferred that the additive particles be discrete, that is non-agglomerated particles, and be substantially spherical in shape. However, good pigmentation is obtained with elongated, rounded particles. When the low profile additive particles are highly irregular in shape or when substantial agglomeration of particles occurs a tendency toward mottled or marbleized appearance may result in the final product. Emulsion or suspension polymerization methods are advantageously employed in the preparation of small, discrete, substantially spherical or rounded polymer particles, although other methods such as solution-precipitation polymerization, or bulk polymerization and subsequent pulverization of the polymeric product, may be employed.

The preferred method is suspension polymerization which may be carried out in a known manner by heating and stirring the monomeric reactants in water in the presence of a suitable catalyst, such as benzoyl peroxide or lauroyl peroxide and a suitable suspension agent such as calcium phosphate or hydroxypropyl methylcellulose.

The control of shrinkage during the molding process and the resultant low profile of the final molded article results from the use of a cross-linked vinyl chloride polymer additive that is swellable in the unsaturated polyester composition but substantially insoluble therein. It is known that the degree to which a polymer swells in a solvent as well as the solubility of the polymer is dependent on the degree of cross-linking present in the polymeric structure. Thus, to achieve the desired control of shrinkage during the molding process the polymer additive of this invention comprises a vinyl chloride-polymer or copolymer that is lightly enough cross-linked so that it is swelled in the unsaturated polyester composition but sufficiently cross-linked so that it does not dissolve therein. The degree of swelling of a polymer may be determined with the use of the known formula and procedure as follows:

$$\% \text{ Swelling} = \frac{(\text{weight of swollen polymer} - \text{weight of dry polymer}) \times 100}{\text{weight of dry polymer}}$$

(See L. H. Sperling and E. N. Mihalakis, J. Applied Polymer Science 17, 3811(1973)).

Using the above formula the following test is employed to determine percent swelling:

Approximately 4 grams of polymer is weighed into a Soxhlet extraction thimble and placed in an extraction apparatus. Toluene (200 ml) is vigorously refluxed so that there is a steady return of fresh solent through the polymer. After 2 hours, the thimble is removed and surplus solvent allowed to drain off by leaving the thimble to stand in a glass funnel for 10 minutes. The polymer is then weighted and the percent swelling is calculated using the above formula.

Based on the swelling index (percent swelling) formula and test described hereinabove, it has been found that lightly cross-linked polymers, suitable for use as low profile additives in accordance with the present invention are preferably characterized by a swelling index of about 200% to about 600%.

The amount of additive component which may be incorporated in the polyester molding composition may vary considerably. To achieve optimum control of dimensional stability and uniform pigmentability of the final product, it is preferred to employ about 5 to about 45 and most preferably about 10 to about 25 parts by weight of additive component per 100 parts by weight of polyester component.

The following specific examples are provided to further illustrate this invention and the manner in which it may be carried out. It will be understood that the specific details given in the examples are provided for purpose of illustration and are not to be construed as a limitation on the invention. In the examples, unles otherwise indicated, all parts and percentages are by weight and all temperatures are in degrees Celsius.

EXAMPLE 1

A pressure reactor was charged with 60 parts of 2-ethylhexyl acrylate, 0.6 parts of 1,3-butylene diacrylate, 0.6 parts of diallyl maleate, 700 parts of water, 0.5 parts of sodium lauryl sulfate, about 50 parts of a 2 percent aqueous solution of hydroxypropyl methylcellulose, 0.2 parts of acetyl cyclohexane sulfonyl peroxide, and 0.5 parts of di(d-ethylhexyl) peroxidicarbonate. The reactor was cooled in an ice-water bath and twice pressurized with nitrogen and then evacuated. Then 350 parts of vinyl chloride was added. The reaction mixture was stirred to form a suspension, then heated, with the aid of a warm water jacket, to 65° C at 130 pounds per square inch for 5 hours. At the end of the reaction period the reactor was cooled and excess vinyl chloride vented. The reaction product was filtered and washed, first with 3000 parts of water, then with 400 parts of methanol, then dried. The dried product was passed through a 20 mesh screen. The resultant powder was examined under a scanning electron microscope and formed to consist of spherical particles having a diameter of about 20 microns, with very slight agglomeration in clusters up to about 100 microns. The polymer had a chlorine content of 47.5 percent. The glass transition temperature of the cross-linked polymer was 75° C. The swell index of the particles, determined in the manner described hereabove, was 530 percent.

EXAMPLE 2

An unsaturated polyester was prepared by esterification of 1.05 moles propylene glycol with 0.90 moles of maleic anhydride and 0.10 moles of phthalic anhydride to an acid number of 35. A 65 percent solution of this polyester in styrene was prepared.

EXAMPLE 3

A bulk molding compound was prepared, molded and tested in the following manner: a dispersion was prepared of 15 parts of the cross-linked polymer of Example 1 in 55 parts of the unsaturated polyester solution of Example 2 and 30 parts of additional styrene. To this dispersion was added 3 parts of a red pigment paste (CM 7106, Plasticolor, Inc., Ashtabula, Ohio), 3 parts of calcium stearate and 0.8 parts of 2,5-dimethyl-2,5-bis (2-ethylhexanoylperoxy) hexane and 1.5 parts of magnesium hydroxide. The mixture was transferred to a sigma blade mixer and 200 parts of ground calcium carbonate and 75 parts of OCF 832¼ inch glass fiber (Owens-Corning Fiberglass) was added with mixing. The molding compound, thus prepared, was stored in a plastic bag at room temperature for 48–72 hours before molding.

Two hundred and eighty parts of the molding compound was charged into an 8 inch × 8 inch mold containing a ⅛ inch × 5 inch rib and a ⅜ inch × 4½ inch rib and molded at 121° C and 1500 pounds per square inch for 2 minutes.

The molded panel had a uniform red color with a shrinkage of −0.38 mils per inch (expansion) perpendicular to the ribs and 0.00 mils per inch parallel to the ribs. Surface profile measured with a Bendix Microcorder, was 180 microinches per half inch averaged over a 2 inch span in the center of the panel and 267 microinches per half inch over the ⅜ inch rib. The molded panel had a Barcol hardness of 51.

EXAMPLE 4

A cross-linked vinyl chloride polymer was prepared following the suspension polymerization procedure of Example 1, except that in place of the monomer composition shown (vinyl chloride, 2-ethylhexyl acrylate, 1,3-butylene diacrylate and diallyl maleate monomers), there was employed 435 parts of vinyl chloride and 1.5 parts of diallyl maleate. The resultant polymeric product, consisted of 409 parts of a fine powder. The powder was examined under a scanning electron microscope and found to consist of spherical particles having a diameter of 20 to 50 microns. The glass transition temperature of the cross-linked polymer was 86.5° C (taken as the mid-point of a range of 82° to 91° C). The swell index of the particles, determined as described hereinabove, was 380%.

The powdered polymer, thus prepared, was incorporated as a low profile additive component of a bulk molding compound, following the procedure of Example 3. The bulk molding compound was then molded and tested as described in Example 3. The molded panel, prepared in this manner had a uniform red color. Shrinkage during molding was found to be 0.32 mils per inch perpendicular to the ribs and 0.75 mils per inch parallel to the ribs. Surface profile was 233 microinches per half inch, averaged over a 2 inch span in the center of the panel and 150 micro-inches per half inch over the ⅜ inch rib.

EXAMPLE 5

A cross-linked vinyl chloride-2-ethylhexyl acrylate copolymer was prepared following the procedure of Example 1, except that in place of the monomer composition shown, there was employed 150 parts of vinyl chloride, 50 parts of 2-ethylhexyl acrylate, and 1.5 parts of diallyl maleate. The resultant polymeric product consisted of 170 parts of a fine, white powder and about 8 parts of larger, irregularly shaped particles. Under examination with an electron scanning microscope, the powder was found to consist of spherical particles having a diameter of about 20 microns with evidence of some agglomeration into clusters ranging up to 200 microns diameter. The glass transition temperature of the cross-linked polymer was 69.5° C (taken as the mid-point of a 62° to 77° C range). The swell index of the particles, determined in the manner described hereinabove, was 500%.

The powdered polymer, thus prepared, was incorporated as a low-profile additive component of a bulk molding compound following the procedure of Example 3. The bulk molding compound was then molded and tested as described in Example 3. The molded panel, thus prepared, was characterized by a uniform red color. Shrinkage during molding was found to be −0.06 mils per inch (very slight expansion) perpendicular to the ribs and 0.88 mils per inch parallel to the ribs. Surface profile was 259 microinches per half inch, averaged over a 2 inch span in the center of the panel and 277 micro-inches per half inch over the ⅜ inch rib.

What is claimed is:

1. A low profile additive for polymerizable unsaturated polyester molding compositions which comprises discrete particles of less than about 50 microns diameter of a lightly cross-linked vinyl chloride polymer characterized by a glass transition temperature of below about 100° Celsius, and comprising the polymeric reaction product of vinyl chloride and about 0.1 to about 10 percent by weight of a polyfunctional monomer.

2. A low profile additive according to claim 1 having admixed therewith a pigment.

3. A low profile additive according to claim 1 comprising the polymeric reaction product of vinyl chloride, at least one monofunctional unsaturated comonomer capable of forming a linear homopolymer having a glass transition temperature of below about 80° Celsius and a polyfunctional monomer.

4. A low profile additive according to claim 3 wherein said monofunctional unsaturated comonomer is present in an amount of less than about 40 percent by weight, based on the total weight of the additive component.

5. A low profile additive according to claim 4 wherein said monofunctional unsaturated comonomer is a monomer capable of forming a linear homopolymer having a glass transition temperature of below about 0° Celsius.

6. A low profile additive according to claim 5 wherein said monofunctional unsaturated comonomer is selected from the group ethyl acrylate, n-butyl acrylate, and 2-ethylhexyl acrylate.

7. A low profile additive according to claim 6 wherein said monofunctional unsaturated comonomer is 2-ethylhexyl acrylate.

8. A low profile additive according to claim 7 comprising the polymeric reaction product of vinyl chloride, 2-ethyl hexyl acrylate, and diallyl maleate.

9. A low profile additive according to claim 8 comprising the polymeric reaction product of vinyl chloride, 2-ethylhexyl acrylate, 1,3-butylene diacrylate and diallyl maleate.

10. A low profile additive for polymerizable unsaturated polyester molding compositions which comprises discrete particles of less than about 50 microns diameter of a lightly cross-linked vinyl chloride polymer characterized by a glass transition temperature of below about 100° Celsius, and consisting essentially of the polymeric reaction product of vinyl chloride and about 0.1 to 5 about 2.0 percent by weight of a polyfunctional monomer.

11. A low profile additive according to claim 10 wherein said polyfunctional monomer is diallyl maleate.

* * * * *